United States Patent
Martinez et al.

(10) Patent No.: US 10,217,104 B2
(45) Date of Patent: Feb. 26, 2019

(54) DEVICE FOR PROTECTION AGAINST THEFT, CORRESPONDING METHOD AND COMPUTER PROGRAM

(71) Applicant: INGENICO GROUP, Paris (FR)

(72) Inventors: Pierre Martinez, L'Etang la Ville (FR); Eric Brier, Malissard (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/562,720

(22) PCT Filed: Mar. 31, 2016

(86) PCT No.: PCT/EP2016/057142
§ 371 (c)(1),
(2) Date: Sep. 28, 2017

(87) PCT Pub. No.: WO2016/156533
PCT Pub. Date: Oct. 6, 2016

(65) Prior Publication Data
US 2018/0121904 A1 May 3, 2018

(30) Foreign Application Priority Data
Mar. 31, 2015 (FR) .................... 15 52762

(51) Int. Cl.
*G06Q 20/32* (2012.01)
*E05B 73/00* (2006.01)
*G08B 13/24* (2006.01)

(52) U.S. Cl.
CPC ..... *G06Q 20/3278* (2013.01); *E05B 73/0017* (2013.01); *G08B 13/242* (2013.01); *G08B 13/2451* (2013.01)

(58) Field of Classification Search
CPC ........... G06Q 20/3278; E05B 73/0017; G08B 13/242; G08B 13/2451
(Continued)

(56) References Cited

U.S. PATENT DOCUMENTS 7,575,161 B2 * 8/2009 Nguyen ................. A47F 9/047
235/383
8,358,211 B2 * 1/2013 Friend ................ G08B 13/2402
235/435
(Continued)

FOREIGN PATENT DOCUMENTS

| EP | 1306821 A2 | 5/2003 |
|---|---|---|
| EP | 2759975 A1 | 7/2014 |
| FR | 2395553 A1 | 1/1979 |

OTHER PUBLICATIONS

International Search Report dated Jul. 27, 2016 for corresponding International Application No. PCT/EP2016/057142, filed Mar. 31, 2016.

(Continued)

*Primary Examiner* — John A Tweel, Jr.
(74) *Attorney, Agent, or Firm* — David D. Brush; Westman, Champlin & Koehler, P.A.

(57) ABSTRACT

An antitheft protection device that includes an electronic antitheft element. The device also includes an element for deactivating the electronic antitheft element; an energy supply at least indirectly powering said element for deactivating the electronic antitheft element; and an element to receive a command to deactivate the electronic antitheft element.

8 Claims, 2 Drawing Sheets

Figure 1A:
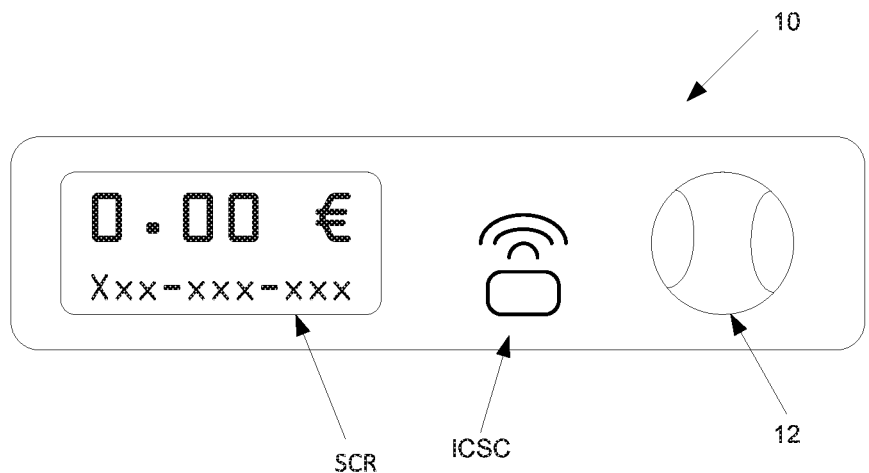

(58) Field of Classification Search
USPC .................................................... 340/572.1
See application file for complete search history.

(56) References Cited

U.S. PATENT DOCUMENTS

| | | | | |
|---|---|---|---|---|
| 2003/0075602 A1* | 4/2003 | Wike, Jr. | ............. | G08B 13/246 |
| | | | | 235/383 |
| 2014/0207660 A1* | 7/2014 | Brink | ................... | G08B 13/242 |
| | | | | 705/39 |

OTHER PUBLICATIONS

Written Opinion of the International Searching Authority dated Jul. 27, 2016 for corresponding International Application No. PCT/EP2016/057142, filed Mar. 31, 2016.

English translation of the International Preliminary Report on Patentability dated Sep. 22, 2017, for corresponding International Application No. PCT/EP2016/057142, filed Mar. 31, 2016.

* cited by examiner

DEVICE FOR PROTECTION AGAINST THEFT, CORRESPONDING METHOD AND COMPUTER PROGRAM

CROSS-REFERENCE TO RELATED APPLICATIONS

This Application is a Section 371 National Stage Application of International Application No. PCT/EP2016/057142, filed Mar. 31, 2016, which is incorporated by reference in its entirety and published as WO 2016/156533 on Oct. 6, 2016, not in English.

1. FIELD OF THE INVENTION

The present invention relates to a device for combatting theft, in particular shoplifting, in order to protect off-the-shelf, self-service articles or items in a commercial retail establishment, for example items of clothing such as garments, footwear, leather goods, etc.

2. PRIOR ART

Known antitheft devices for these off-the-shelf items are most often of the type comprising a tag comprising two parts: one part attached to the article to be protected and taking the form of a nail pierced through the article and passing through it and the other part receiving the point or tip of the nail and housing the electronic antitheft system and a locking system capable of holding captive the point of the nail.

The document FR2395553 describes for example such a device. The item to be protected is thus pierced by the nail and held tightly against the opposite part of the device, which retains said nail. This same part comprises an electronic antitheft element such as a resonant electrical circuit capable of responding to the presence of a magnetic, radiofrequency or electromagnetic interrogation field of an external detection system. When the item provided with the antitheft device goes through a surveillance or interrogation area, the electrical circuit of the antitheft device cooperates with the detection system put in place, triggering an alarm signal at the resonance frequency of the electrical circuit of the device. The antitheft device is removed from the article by means of a magnetic support tool to which the part of the device provided with the nail-locking system is applied.

Other antitheft devices, based on similar principles, exist: they differ from the device described above for example in the shape of the device or again on the basis of whether or not they use a flexible cable instead of the nail. Recently, contactless labels and RF labels have appeared, also acting as antitheft devices. Such labels are either directly integrated into the article (they are for example labels for garments stitched to the interior of the garment) or glued to the article (these are labels comprising a self-sticking part).

These devices are considered to be efficient in restricting theft. They however have one major drawback: they have to be deactivated by a special device when the article passes through the checkout desk. More particularly, for two-part mechanical antitheft systems such as the one presented in the document FR2395553, the antitheft device needs to be dismantled at the checkout desk after purchase. Label-type antitheft devices must be subjected to a magnetic field of higher or lower intensity that leads to their deactivation. This system is not free of problems, for example during periods of peak customer presence in shops (during sales or promotions). The fact of having to dismantle or deactivate the antitheft system increases the time needed for the customers to pass through the checkout desk in varying degrees. This gives rise to lengthy waiting times at the checkout desks. Now, many customers are not necessarily willing to wait at the checkout desk and prefer to relinquish their purchases rather than wait. The leads to a loss in earnings of varying magnitudes for the merchant.

3. SUMMARY OF THE INVENTION

The proposed system does not have these drawbacks of the prior art. More particularly, the proposed system facilitates the act of purchase while at the same time preventing theft. The proposed system relates more particularly to an antitheft protection device comprising a function of payment and/or automatic unlocking when a payment is made.

Thus, the potential purchaser can make a purchase without having to wait for the release of the antitheft protection device. When the purchase is made (either by means of the antitheft protection device itself or by other means), the antitheft protection device gets unlocked, enabling the user to take away the article that he has purchased and leave the sales point without having to wait. With the antitheft protection device of the invention, the sales point or the merchant can avoid loss of earnings during peak sales times and increase customer satisfaction.

According to one particular embodiment, the antitheft protection device is of a type comprising an electronic antitheft element device; it also comprises:

an element for deactivating the electronic antitheft element;
energy supply means, at least indirectly powering said element for deactivating the electronic antitheft element;
means for receiving a command to deactivate the electronic antitheft element.

Thus, such a device can be used to make a purchase without necessarily having to transit through a checkout desk or a payment terminal. Such a device therefore facilitates the act of purchase and thereby resolves at least two problems, namely waiting times at checkout desks and loss of earnings due to such waiting times at checkout desks.

One particular embodiment comprises a contactless communications module.

Thus, such a device can be used to make a purchase by using any type of contactless payment means such as for example a contactless bank card or a contactless payment mobile terminal.

One particular embodiment also comprises:

a processor for managing at least one mode of operation of the antitheft protection device;
a storage memory for storing relevant data.

According to one particular embodiment, the processor manages at least two modes of operation comprising:

a configuration mode in which the device can receive relevant data in the storage memory;
a protection mode.

According to one particular embodiment, the protection mode comprises a payment sub-mode in which the device carries out at least one part of a payment transaction using a payment means.

According to one particular embodiment, the protection mode comprises an unlocking sub-mode in which the device drives the element for deactivating the electronic antitheft element by means of the processor.

According to one particular embodiment, the unlocking mode is activated in at least two different ways:

upon reception of an unlocking command coming from the processor of the device, this unlocking command resulting from a payment made at least partly using the processor;

upon reception of an unlocking command coming from the processor of the device, this unlocking command resulting from a payment made by a system for managing a sales point within which the protection device is positioned.

According to one particular embodiment, the protection mode comprises a permanent locking sub-mode in which said device cancels out an attempt to implement another mode of operation.

Thus, such a device prevents theft, for example following a loss of autonomy (weak battery) or for example in conditions of major electromagnetic disturbance.

One particular embodiment furthermore comprises means for displaying at least one piece of useful data intended for a consumer.

Thus, such a device ensures that the user (the consumer) can obtain knowledge of useful information such as price, size, weight etc when purchasing the product.

According to one particular embodiment, the device according to claim 1 is integrated into a basket.

Thus, the antitheft protection device comprises at least two modes of operation: a mode of operation called a configuration mode, in which the antitheft protection device can receive a piece of useful data and/or data needed for its payment and/or unlocking function and the protection mode in which the antitheft protection device is associated with an article and is capable of getting unlocked upon reception either of an unlocking command coming from a payment system of the sales point or of one or more valid bank card identifiers (when the device integrates a payment function).

In this configuration mode, which can be active by default as soon as the device is no longer associated with an article (i.e. for example when the locking nail is removed or when the device is separated from another type of locking means), the protection mode is implemented when the locking nail is associated with the antitheft protection device. In the configuration mode, an additional actuator can be used for example so that the antitheft protection device passes into a sub-mode called a data reception sub-mode. In this mode, this device is capable of receiving data, for example configuration data relating to the price to be paid or again configuration data relating to the type of article or its size. Thus, such an actuator avoids the need for the device to wait for configuration data as soon as it is deactivated: this extends the service life of the battery and prevents the need to recharge the device at excessively frequent intervals.

The device comprises at least one power management module configured to deactivate the unlocking functions and/or payment functions when the level of electrical power supply falls below a pre-determined threshold.

Thus, when the battery of the device falls below a given threshold, the antitheft protection device passes into an inactive mode. This inactive mode requires passage through the checkout desk and unlocking by hand. Thus, even when the electrical power supply becomes insufficient, the protection device continues to perform its usual protection function.

Said device comprises a contactless communications module that enables the reading of data, said contactless communications module that enables the reading of data being configured to obtain data relating to the article on which it is placed.

The contactless communications module that enables the reading of data implements the existing detection antenna of the detection device to read the data.

Thus, it is possible to automatically (or semi-automatically) configure the antitheft protection device by direct retrieval, from the article in which it is installed, of relevant data such as data relating to prices or to the size of the garment or other data of this type that can be present in a contactless label existing on the article on which the device is installed. This facilitates the placing and the configuration of the antitheft protection device.

Thus, it is not necessary to have an additional antenna to be able to obtain data on the article on which the device is installed.

The protection module comprises a display module configured to display data relevant intended for a user. Such a display module can be used for example to control a low-consumption liquid-crystal screen. This screen can then display data useful for the user or consumer, for example the price of the article, its size or any other piece of data relevant to the purchase. The screen can also be used to display configuration data and/or data relating to the battery. The pieces of relevant data are for example obtained from the contactless communications module when the protection device is placed on the article to be protected and when for example the actuator is actuated so that the device can read the data from the contactless label already present on the article to be protected. The relevant data can also be transmitted from another wireless interface for example Zigbee, using the management system of the sales point.

The protection device, in configuration mode, can for example in one particular embodiment implement the method comprising the following steps:

detecting the passage into configuration mode;
reading a piece of data identifying the article to be protected, the reading being done by means of the contactless communications module;
transmitting said piece of data identifying a management device by means of a wireless transmission interface (for example Zigbee, Bluetooth LE);
receiving at least one piece of relevant data from said management device.

When a screen is available on the protection device, at least one piece of useful data is displayed, depending on said at least one piece of relevant data received.

The protection device, in protection mode, can for example in one particular embodiment implement the method comprising the following steps:

receiving an unlocking command;
implementing unlocking means.

These two steps can advantageously be complemented by the preliminary steps of:

receiving a piece of identification data for identifying a contactless payment means by means of the contactless communications interface of the protection device;
transmitting, to a device situated on a communications network, of a piece of data representing a price to be paid and the piece of data identifying the payment means; implementing a payment transaction by means of the previously transmitted data.
Subsequently to the implementation of the unlocking means, the invention comprises the display of a piece of information enabling the payment to be validated, for example on the display means of the protection device. The steps for receiving identification data, transmitting of data and carrying out payment can be done on the protection device itself or else by other devices connected to each other by means of a communications network.

According to a preferred implementation, the different steps of the methods according to the proposed technique are implemented by one or more software programs or computer programs comprising software instructions that are to be executed by a data processor of a relay module according to the proposed technique, these programs being designed to control the execution of different steps of the methods.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The proposed technique is also aimed at providing an information medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc.).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with one another to implement the proposed technique.

4. FIGURES

Figure 1B:
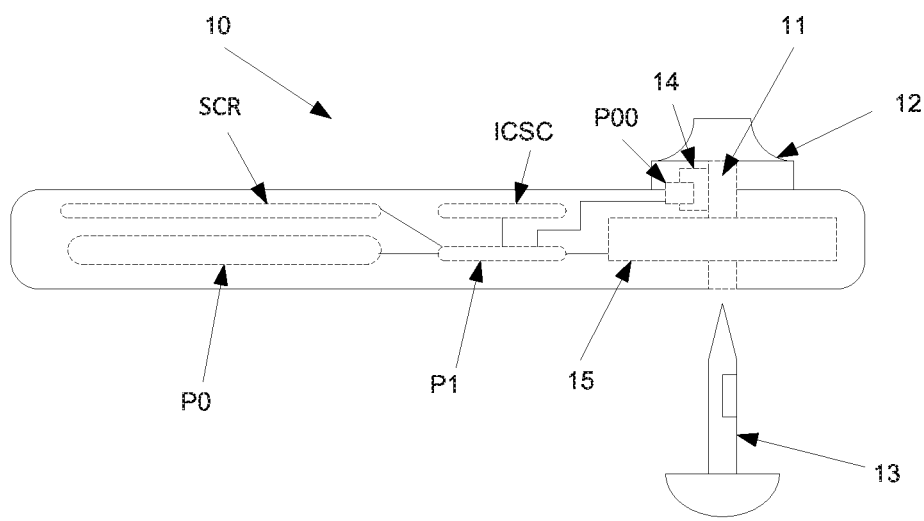
Figure 2:
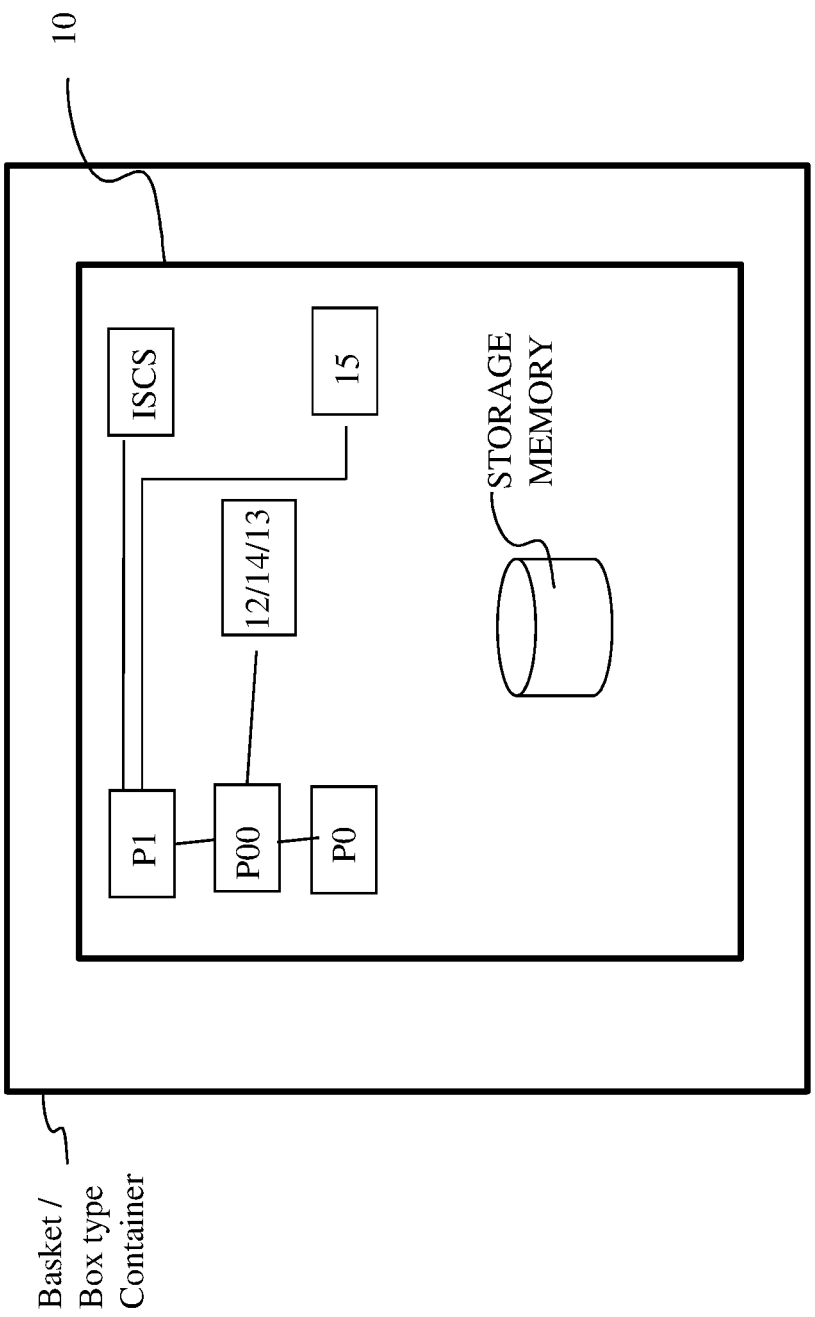

Other features and advantages of the invention shall appear more clearly from the following description of two embodiments given by way of simple illustratory and non-exhaustive examples and from the appended drawings, of which:

FIG. 1a illustrates a first embodiment;

FIG. 1b also illustrates the embodiment shown in FIG. 1a;

FIG. 2 is a block diagram illustrating a basket/box type container.

5. DESCRIPTION

5.1. Reminders

In searching for a solution that provides antitheft protection for articles in a self-service store and, at the same time; facilitates the act of purchase, the inventors have therefore had the idea of integrating the payment and/or unlocking functions within one antitheft protection device. Several embodiments can be envisaged. Two main embodiments are described here below.

A general principle however can be deduced. More particularly, this principle is that of making the deactivation of the antitheft function conditional on the implementation of a deactivation command (a command following the implementing of a payment for example). The antitheft device (also called an antitheft protection device or protection device) is a smart device that is capable itself of carrying out a payment transaction and/or for example receiving a deactivation command from a payment device. Thus, the antitheft system has a capacity of autonomous deactivation that takes the form of the use of a deactivation element, means of energy supply (electrical for example) and means for receiving a command to deactivate an electronic antitheft element. In addition, apart from the fact of continuing to protect off-the-shelf, self-service articles, the protection device becomes a sales assistance device. As explained here below, the protection device can indeed have a screen, for example a low-consumption liquid-crystal screen, said screen being capable of being used to display information needed by the customer, such as for example information on the price or size of the article or articles that will be purchased. In a first embodiment of the proposed technique described here below, the deactivation element can unlock a grasping means (for example a nail, a locking spring etc.) that exerts action on a locking element, so that the device can be removed by a user (for example a customer or a merchant). In a second embodiment of the proposed technique described here below, the deactivation element can deactivate (unlock) an antitheft device (for example an RFID label) when it receives a command to do so (for example a command following a payment).

In general, the protection device comprises, as is customary, an electronic antitheft element taking for example the form of a copper coil or an antenna. When the device passes through a detection barrier, it causes a distortion of the signal (magnetic, electromagnetic, radio frequency signal) emitted by the protection barrier and prompts the triggering of an alarm. The protection device furthermore comprises a processor such as for example a secure processor. Such a processor can for example be embedded in a securing module (for example a printed-circuit board, JAVA card or the like.) directly molded in the body of the protection device (just like in the electronic antitheft element). This processor acts as a memory, this memory being used to record relevant data. These pieces of data are for example the price of the article or articles, the size, the weight, the number of times that the device has been activated and deactivated. The relevant data can also be encryption keys, addresses (addresses of Bluetooth, LE, Zigbee and other types of wireless communications modules). Some of these pieces of relevant data are implanted during the phase of manufacture of the protection device while others are received in a configuration phase. The device also comprises a battery (which may or may not be rechargeable) providing for an input of energy sufficient to process the data transmitted and received and providing for an input of energy sufficient to implement an unlocking module if any (when this unlocking module is present). The device, in another embodiment, also comprises a contactless communications module (for example of the NFC type) enabling the reception from a payment means (for example a contactless bank card or communications terminal having available a contactless communications module), of the pieces of data necessary to implement a payment (card number, bearer's name etc.).

The protection device comprises two distinct modes of operation: a configuration mode in which the device receives relevant data in order to be put into operation. In this mode, the device cannot as yet be used to make payment or to carry out an unlocking operation. The device also comprises a protection mode in which, depending on its hardware and software configuration, it implements one or more of the following sub-modes:

a payment sub-mode in which the device is capable of carrying out at least one part of a payment transaction using a payment means (such as a contactless payment means);
  an unlocking sub-mode in which the device is capable of unlocking a grasping means (such as a nail, a locking spring etc.) that acts on the locking element so that the device can be removed by the user (for example a consumer or a merchant); this unlocking mode can be activated in two different ways, depending on the situation and hardware and software configuration of the protection device:
    receiving an unlocking command coming from the processor of the device, this unlocking command following a payment made at least partly by means of the processors;
    receiving an unlocking command coming from the processor of the device, this unlocking command following a payment made by the management or marketing system of the sales point;
  a permanent locking sub-mode, in which the protection device behaves like a usual antitheft device. Such a mode is implemented when the protection device is no longer capable of properly fulfilling its functions of payment and/or an unlocking command for example following a loss of autonomy (weak battery) or for example under conditions of major electromagnetic disturbance.

In this configuration, the protection device is capable of receiving relevant data. It receives information either from a wireless transmission system (Zigbee, Bluetooth) or contactless transmission system (NFC). The following method is implemented:

detecting the passage into configuration mode; this detection can for example be done by using an actuator (such as a physical or software switch);
  obtaining relevant data.

Relevant data can be obtained in at least two different ways. A first method comprises the following:

reading, by means of the contactless communications module of the protection device, of a piece of data identifying the article to be protected (data contained for example in a contactless label already present on the article to be protected);
  transmitting said piece of identification data to a management device by means of a wireless transmission interface (for example Zigbee, Bluetooth, Bluetooth LE);
  receiving at least one piece of relevant data from said management device.

When a screen is available on the protection device, at least one piece of useful data is displayed as a function of said at least one piece of relevant data received.

A second method comprises the reception, from a configuration device (of a mobile terminal or laptop type), of the above-mentioned relevant data and the recording of this data in the memory of the antitheft device.

In general, the following methods are implemented. The protection device, in configuration mode, can for example in one particular embodiment implement the method comprising the following steps:

detecting the passage into configuration mode;
  reading, by means of the contactless communications module, of a piece of data identifying the article to be protected;
  transmitting of said piece of identification data to a management device by means of a wireless transmission interface (for example Zigbee, Bluetooth, LE);
  receiving at least one piece of relevant data from said management device.

When a screen is available on the protection device, at least one piece of useful data is displayed, depending on said at least one piece of relevant data received.

The protection device, in protection mode, can for example in one particular embodiment implement the method comprising the following steps:

receiving an unlocking command;
  implementing unlocking means.

These two steps can advantageously be complemented by the preliminary steps of:

receiving a piece of data for identifying a contactless payment means through the contactless communications interface of the protection device;
  transmitting, to a device situated on a communications network, of a piece of data representing a price to be paid and the piece of data for identifying the payment means;
  implementing a payment transaction by means of the previously transmitted data.

Here below we describe two different embodiments of the protection device.

5.2. Descriptions of a First Embodiment

In this first embodiment, described with reference to FIGS. 1a and 1b, the technique takes the form of an antitheft device (10) having a generally rectangular parallelepiped and elongated shape and having, at one of its extremities, a hole (11) and a prominent portion (12) to receive the tip of a nail (13). This prominent portion (12), when it exists, comprises for example a system for retaining the nail (14)

that penetrates the hole (11). When the prominent portion does not exist (for example because of the general thickness of the device), the system for retaining the nail (14) is integrated into the antitheft device (10). The shape of the antitheft device is of little importance and the above examples are given purely by way of an indication. In addition to the nail-retaining system, the antitheft device also conventionally comprises a coil (15), for example of copper wire, said coil being used to prompt a disturbance in a magnetic field (or electrical, radiofrequency, electromagnetic or other field) when the antitheft device passes through walkthrough theft detectors. This type of system has been used, with variants, for several years in order to detect the passage of antitheft devices and trigger a siren and/or a light of display.

In this embodiment, the antitheft device furthermore comprises a set of means used to make a payment. More particularly, the antitheft device comprises autonomous unlocking means. This autonomous unlocking means comprise for example an electrical energy source (P0) (such as rechargeable battery) and an actuator (P00) (for example an electrical motor). The actuator (P00) is capable for example of mechanically modifying the state of a claw for holding the nail (when this system is used). The actuator is therefore powered by the electrical energy source (P0). It is capable of receiving an unlocking command. To the end, the actuator receives an unlocking command which can be transmitted in at least two different ways:

In a first variant, the unlocking command is transmitted by means of a processor (P1) which is itself integrated into the antitheft device, this processor being also in charge of carrying out a payment transaction: in this variant, the antitheft device is therefore (at least partially) autonomous in carrying out the payment transaction;

In a second variant, the unlocking command is also transmitted by means of a processor (P1) which is also integrated into the antitheft device; by contrast, this processor is not in charge of carrying out the payment transaction. It only receives commands from a central system, for example an encashment and payment system of the sales point: the processor of the antitheft device then plays the role of a relay between the checkout and payment system of the sales point and the user's payment means.

The processor (P1) draws its electrical power from a complementary power source (not shown) or else from the battery of the device (P0).

Thus, depending on different alternative embodiments, either the antitheft device can be used directly to make payment or it can be used to carry out an unlocking operation.

The implementation of the payment, in a first variant, comprises the use by the antitheft device of a contactless communications interface (ICSC) said interface enabling the reading of data coming from a contactless payment means (for example bank card or again a mobile terminal). This is for example an NFC interface. It can be also noted that to prevent this interface form consuming excessive battery power for the antitheft device, this antitheft device also has means of activating the interface, these means being implemented only under special conditions. When these means are activated, the contactless communications interface (denoted as ICSC) in the antitheft system is activated and it can read data coming from a contactless payment means. In one simple embodiment, the means for activating the contactless communications interface (ICSC) take the form of a push-button (not shown) situated for example next to the price of the article. When the button is pressed, the contactless communications interface is activated for a pre-determined period of time (for example a few seconds or a few tens of seconds). During this period, the contactless data can be received. In another embodiment, the means takes the form of a proximity sensor capable for example of detecting the presence of a hand that has grasped the antitheft system with an appropriate sensor using an impedance variation (or a variation in resistance).

When the contactless communications interface (ICSC) is activated, a contactless payment transaction can be implemented according to the usual standards in the field (for example ISO 14443 which are not the object of the present payment application). When the antitheft device receives confirmation of the efficient performance of the transaction (for example coming from a bank server and/or from an intermediate processing server for processing transactions of the merchant), then the actuator (P00) of the antitheft device is implemented (to release the grip on the nail) by the processor (P1) and the user can separate the nail and the antitheft device. The user then gets rid of the antitheft device by placing it in a recipient designed for this purpose in proximity to the shop exit (for example in proximity to walkthrough theft detectors) and can leave the shop with the article that he has just paid for.

The implementation of the payment in the second variant is somewhat different. A contactless communications interface (ICSC) is still used. However, this contactless communications interface is inserted within a contactless payment terminal, which is itself situated for example in proximity to the exit of the shop (for example in proximity to the walkthrough theft detectors) or at the level of traditional-type checkout desks. The contactless payment transaction is conducted from the contactless payment terminal according to the usual standards in the field. When the contactless payment terminal receives confirmation of efficient performance of the transaction (for example coming from a bank server and/or from a transaction processing server of the merchant), then the contactless payment terminal sends the antitheft device a release command that is processed by the processor (P1) of the antitheft system and generates the implementing of the actuator (P00) in order to release the nail. The user gets rid of the antitheft device by placing it in a recipient designed for this purpose in proximity to the shop exit (for example in proximity to walkthrough theft detectors) and can leave the shop with the article that he has just paid for.

Accessorily, the antitheft system also has a screen (SCR) for example a liquid-crystal screen enabling the display of various pieces of information related to the article to which the antitheft device is fixed. This screen (SCR) is connected by means of a display bus to a processor not shown (which can be identical to the processor P1 in charge of carrying out the payment function and/or the unlocking function). The processor is itself connected to a memory (not shown) which comprises the information to be displayed.

In addition, in at least one embodiment, the transmission of data between the antitheft device and the devices likely to communicate with it (for example the payment cards, communications terminals, the payment terminals etc.) are done by means of an antenna formed by the copper coil serving to detect theft. This approach averts a situation where an additional antenna has to be inserted into the antitheft system.

Moreover, in at least one embodiment, the antitheft system can obtain pieces of complementary data from the RFID label. In addition, in at least one embodiment, the antitheft system can erase or re-set the content of an RFID label.

Indeed, as indicated here above, a non-negligible quantity of articles (such as clothing) are manufactured in directly integrating an RFID label. This RFID label is advantageously used to store information on the article (for example a barcode, or the encrypted equivalent of a barcode) and/or to play an antitheft role. Thus, in one embodiment, the antitheft device automatically retrieves data coming from an RFID label already present on the product. This resolves at least two additional problems. The first relates to the configuration of the antitheft device when it comprises a screen indicating the price of the article. On the basis of the RFID label, the antitheft system obtains an identifier (for example a barcode). The identifier is transmitted by the antitheft system to a central system (for example the central management system of the sales point), which responds to the antitheft system by sending it the price to be displayed. These steps are implemented once per product, when the antitheft system is attached to the product. Obtaining data coming from the central system of the sales point can be implemented by means of a low-consumption protocol (for example Zigbee) in order to extend the service life of the battery to the maximum.

In addition, the fact that the antitheft system can erase or re-set the content of an RFID label deactivates it when the customer has made his payment. More specifically, the antitheft system, again using its coil, emits a magnetic field sufficient to erase the data from the label and make it inoperable.

In one variant, the device takes the form of a box or a bag (as shown in FIG. 2) containing one or more articles inserted by the merchant himself, prior to making it available to the customers. This embodiment is well suited to articles that cannot be pierced by a nail such as for example rigid boxes containing video games, videos (DVD etc.) or again memory cards. The mode of operation in this variant is identical to the mode of operation in the first embodiment. The autonomous unlocking device then takes a somewhat different form.

Finally, in at least one embodiment, the coil of the antitheft device is used to recharge the battery of the antitheft system. More specifically, when the antitheft system is removed from the article that it protects, it is placed by the client or the merchant in a basket specifically provided for this purpose. This basket comprises an inductive coil, powered by an energy source that induces a current in the coil of the antitheft device, this current being used to carry out a recharging of the rechargeable battery of the antitheft device.

5.3. Description of a Second Embodiment

In this second embodiment, the protection device takes the form of a bag or box type container, as shown in FIG. 2. The second embodiment is suited for example to articles that cannot receive any protection device as described in the first embodiment. Essentially, the components of the protection device in this second embodiment are the same as in the first embodiment and their operation is on the whole identical. Thus, in this second embodiment, the protection device comprises a processor, a memory, wireless and contactless communications interfaces, a screen, a power source. However it does not necessarily include any locking and unlocking element as described here above since it is not used to be affixed to an article in particular. On the contrary, the protection device in a first variant of this second embodiment is intended to receive one or more articles that a client or a consumer wishes to acquire in such an act of purchase.

To replace the locking and unlocking element described in the first embodiment, an electromagnetic device is used. This device has a function: the first function is to enable the detection, by a walkthrough theft detector for example, of an attempt to steal the device (and any articles that it contains). Accessorily, this device also fulfils the function of inhibiting existing protection systems on articles that the user wishes to purchase. As explained here above, a majority of commonly consumed articles are now equipped with contactless labels (RFID). They play the role of identifying a product and at the same time that of being antitheft protection devices. According to the proposed technique, an electromagnetic field is used to neutralize this contactless label after the customer has paid for the articles that he had placed in the protection device of the present technique.

Indeed, as in the first embodiment, in this embodiment the antitheft system comprises a set of means to carry out payment. More particularly, the antitheft system comprises independent neutralization means. These independent neutralization means in this embodiment take the form of an electrical energy source (such as a rechargeable battery, which can be the same the one used to make the processor work) and an electromagnetic neutralizing device (for example a metal wire coil). The electromagnetic device is capable for example of annihilating the contactless label by producing a sufficiently strong electromagnetic field. The electromagnetic device is therefore powered by the electrical energy source. It is capable of unlocking the antitheft system. To this end, the electromagnetic device receives an unlocking command which can be transmitted in at least two different ways:

in a first sub-variant, the unlocking command is transmitted by means of a processor (P1) which is itself integrated with the antitheft system, this processor being also in charge of carrying out a payment transaction; in this variant, the antitheft system is therefore (at least partially) independent in order to carry out the payment transaction;

in a second sub-variant, the unlocking command is also transmitted by means of a processor (P1) which is also integrated with the antitheft system; by contrast, this processor is not in charge of carrying out the payment transaction. All it does is receiving commands from the central system, for example a checkout and payment system at the sales point; the processor of the antitheft system thus plays the role of a relay between the checkout and payment system of the sales point and the user's payment means.

In this variant of the second embodiment, the implementation of the payment is carried out in the same way as in the first embodiment.

In this second embodiment, the antitheft protection device can take the form of a box, a basket etc. Thus, for example, the basket is taken by the customer at the shop entrance and is used to place articles in it and then take these articles out in order to pay for them. The basket is thus "smart" and capable, with the means described here above, of totalizing the amount corresponding to the articles placed in this device. The basket is also an antitheft device and it is the payment card that releases the antitheft system of the basket and enables the customer to take his purchases from the basket after payment. It can be planned that the basket will "ring" when the customer has removed the article without making payment. This implies that the basket must be capable of detecting the entry and exit of an article.

To resolve this problem, the basket is provided with a detector. Such a detector takes the form for example of one or more infrared cells and a corresponding infrared LED. When a hand is inserted into the basket, the detector records the passage of this hand. It detects either the addition of an article or the removal of an article. The zone for inserting articles into the basket is shaped to ensure that only one article can be inserted (or removed) at a time. When the detector detects the insertion of an article, it triggers the implementing of an RFID label reader (inserted into the basket) to obtain at least the price of the article that has just been inserted (either by linking up to a database or directly from the label): to do so, it uses the means, especially the communications and scanning means, described here above. The price is added to the total price of the articles in the basket. When the detector detects the removal of an article, it triggers the implementing of an RFID label reader (inserted into the basket) to obtain at least the price of the article that has just been removed (either by linking up to a database or directly from the label): to do so, it uses the means, especially the communications and scanning means, described here above. The price is subtracted from the total price of the articles in the basket.

As in indicated here above, when the articles present in the basket have been paid for, for example with one of the methods described here above, a command for unlocking the RFID labels of the products of the basket is transmitted. The electromagnetic device receives the unlocking command and for example implements an electromagnetic discharge which leads to deactivation of the labels.

The invention claimed is:

1. An antitheft protection device of the type comprising an electronic antitheft element, the device being configured to protect at least one article in a self-service sale or being integrated in a basket or a box-type container, wherein the antitheft protection device comprises:
    a storage memory storing relevant data;
    a processor managing least two modes of operation comprising:
        a configuration mode in which the device can receive the relevant data in the storage memory; and
        a protection mode, in which said device protects said at least one article against theft, comprising a permanent locking sub-mode in which said device cancels out an attempt to implement another mode of operation;
    an element for deactivating the electronic antitheft element controlled by said processor;
    an energy supply powering said element for deactivating the electronic antitheft element; and
    at least one communications interface for receiving a command to deactivate said electronic antitheft element, said command being processed by the processor.

2. The antitheft protection device according to claim 1, wherein the device further comprises a contactless communications module.

3. The antitheft protection device according to claim 1, wherein the relevant data belongs to the group consisting of:
    data relating to at least one article;
    data on a configuration of said device.

4. The antitheft protection device according to claim 1, wherein the protection mode comprises a payment sub-mode in which the device carries out at least one part of a payment transaction using a payment element.

5. The antitheft protection device according to claim 1, wherein the protection mode comprises an unlocking sub-mode in which said deactivating element deactivates the electronic antitheft element by using the processor.

6. The antitheft protection device according to claim 5, wherein the unlocking mode is activated in at least two different ways:
    upon reception of an unlocking command coming from the processor of the device, this unlocking command resulting from a payment made at least partly, by using the processor;
    upon reception of an unlocking command coming from the processor of the device, this unlocking command resulting from a payment made by a system for managing a sales point within which the protection device is positioned.

7. The antitheft protection device according to claim 1, wherein the device further comprises at least one piece of useful data intended for a consumer.

8. The antitheft protection device according to claim 1, wherein the device is integrated into a basket.

* * * * *

UNITED STATES PATENT AND TRADEMARK OFFICE
CERTIFICATE OF CORRECTION

PATENT NO. : 10,217,104 B2
APPLICATION NO. : 15/562720
DATED : February 26, 2019
INVENTOR(S) : Pierre Martinez and Eric Brier Page 1 of 1

It is certified that error appears in the above-identified patent and that said Letters Patent is hereby corrected as shown below:

In the Claims

Claim 1. Column 13, Line 38, insert --at-- after "a processor managing"

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*